United States Patent
Hosoda

(10) Patent No.: US 9,184,863 B2
(45) Date of Patent: Nov. 10, 2015

(54) METHODS AND APPARATUS TO MULTIPLEX LIGHT SIGNALS

(71) Applicant: Schlumberger Technology Corporation, Sugar Land, TX (US)

(72) Inventor: Yuji Hosoda, Sagamihara (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 177 days.

(21) Appl. No.: 13/736,897

(22) Filed: Jan. 8, 2013

(65) Prior Publication Data

US 2014/0193153 A1   Jul. 10, 2014

(51) Int. Cl.
| | |
|---|---|
| *H04J 14/00* | (2006.01) |
| *G01V 8/24* | (2006.01) |
| *E21B 49/08* | (2006.01) |
| *G01V 8/00* | (2006.01) |

(52) U.S. Cl.
CPC ............... *H04J 14/00* (2013.01); *E21B 49/08* (2013.01); *G01V 8/00* (2013.01); *G01V 8/24* (2013.01); *E21B 2049/085* (2013.01)

(58) Field of Classification Search
CPC ......... E21B 49/08; E21B 49/085; H04J 14/00
See application file for complete search history.

(56) References Cited

U.S. PATENT DOCUMENTS

| | | | | |
|---|---|---|---|---|
| 3,144,555 | A | * | 8/1964 | Aroyan et al. ............... 250/351 |
| 3,506,834 | A | * | 4/1970 | Buchsbaum et al. ......... 398/101 |
| 4,492,862 | A | | 1/1985 | Grynberg et al. |
| 5,189,485 | A | * | 2/1993 | Hackel et al. ................. 356/320 |
| 5,475,518 | A | * | 12/1995 | Karaki .......................... 398/201 |
| 5,790,287 | A | * | 8/1998 | Darcie et al. .................. 398/108 |
| 6,724,994 | B1 | * | 4/2004 | Collings et al. ................ 398/75 |
| 7,114,562 | B2 | | 10/2006 | Fisseler et al. |
| 7,330,660 | B2 | * | 2/2008 | Duelk ............................. 398/91 |
| 7,336,356 | B2 | | 2/2008 | Vannuffelen et al. |
| 7,609,380 | B2 | | 10/2009 | Vannuffelen et al. |
| 7,968,841 | B2 | | 6/2011 | Csutak |
| 8,718,473 | B2 | * | 5/2014 | Zhang et al. ................... 398/72 |
| 2010/0028002 | A1 | * | 2/2010 | Qian et al. ..................... 398/79 |
| 2011/0108720 | A1 | | 5/2011 | Ford et al. |

FOREIGN PATENT DOCUMENTS

| | | | |
|---|---|---|---|
| EP | 512642 A1 | * 11/1992 | ............. H04J 14/02 |
| WO | 2012/005725 | 1/2012 | |

OTHER PUBLICATIONS

"Model SR540 Optical Chopper," Stanford Research Systems, Inc.
International search report for the equivalent PCT patent application No. PCT/IB2014/058034 issued on Apr. 15, 2014.

* cited by examiner

*Primary Examiner* — Leslie Pascal
(74) *Attorney, Agent, or Firm* — Daryl R. Wright; Jody DeStefanis

(57) ABSTRACT

Methods and apparatus to multiplex light signals are disclosed herein. An example method includes conveying a first light signal via a first optical path and conveying a second light signal via a second optical path. The example method also includes frequency-division multiplexing and time-division multiplexing the first light signal and the second light signal to enable generation of a multiplexed light signal. The example method further includes directing the multiplexed light signal into an optical detector.

17 Claims, 6 Drawing Sheets

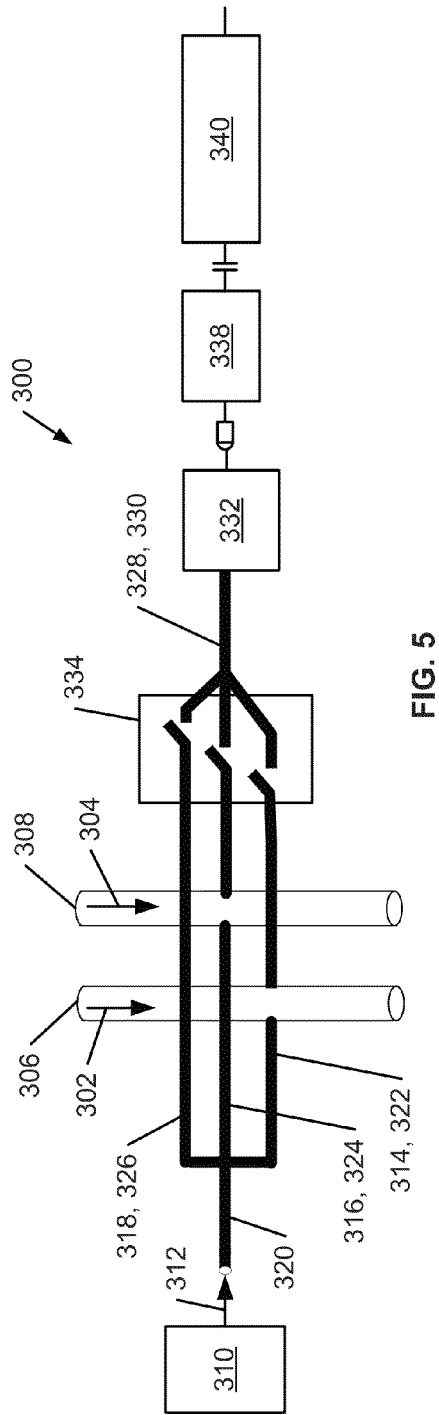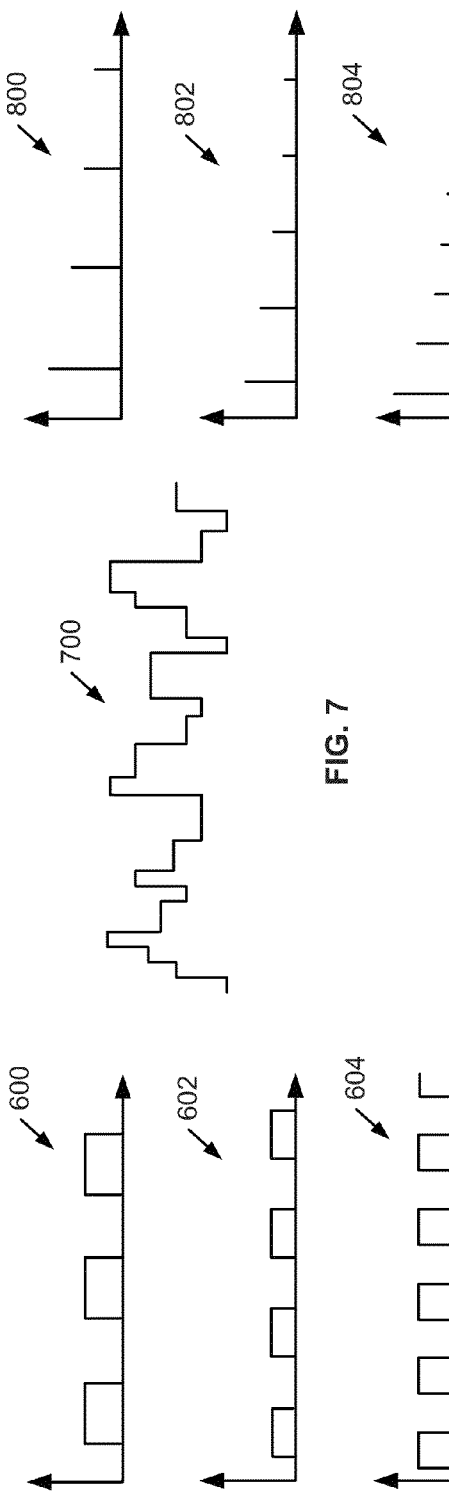

METHODS AND APPARATUS TO MULTIPLEX LIGHT SIGNALS

BACKGROUND OF THE DISCLOSURE

In certain applications, formation fluid is extracted from a subterranean formation into a flowline of a downhole tool. As the formation fluid flows through the flowline, the formation fluid may be analyzed in-situ to determine one or more characteristics and/or properties of the formation fluid.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An example method disclosed herein includes conveying a first light signal via a first optical path and conveying a second light signal via a second optical path. The example method also includes frequency-division multiplexing and time-division multiplexing the first light signal and the second light signal to enable generation of a multiplexed light signal. The example method further includes directing the multiplexed light signal into an optical detector.

Another example method disclosed herein includes directing a light flux into a first fiber bundle. The first fiber bundle is to split into a first fiber sub-bundle and a second fiber sub-bundle. The example method further includes chopping a first light signal communicated via the first fiber sub-bundle at a first frequency, and shuttering the first light signal during a first time slot. The example method also includes chopping a second light signal communicated via the second fiber sub-bundle at a second frequency different than the first frequency, and shuttering the second light signal during a second time slot different than the first time slot. The first light signal and the second light signal are combined to form a multiplexed light signal.

An example apparatus disclosed herein includes a downhole tool. A first flowline and a second flowline are disposed in the downhole tool. The example apparatus further includes a first optical path to be in optical communication with a first fluid sample flowing through the first flowline, and a second optical path to be in optical communication with a second fluid sample flowing through the second flowline. The example apparatus also includes an optical chopper and an optical shutter disposed along the first optical path and the second optical path. The first optical path and the second optical path are to merge into a third optical path. An optical detector is in optical communication with the third optical path to receive a multiplexed light signal via the third optical path.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 5 illustrates yet another example system in which embodiments of methods and apparatus to multiplex light signals can be implemented.

FIG. 6 illustrates example light signals disclosed herein.

FIG. 7 illustrates an example multiplexed light signal disclosed herein.

FIG. 8 illustrates example demultiplexed signals disclosed herein.

DETAILED DESCRIPTION

Figure 1:
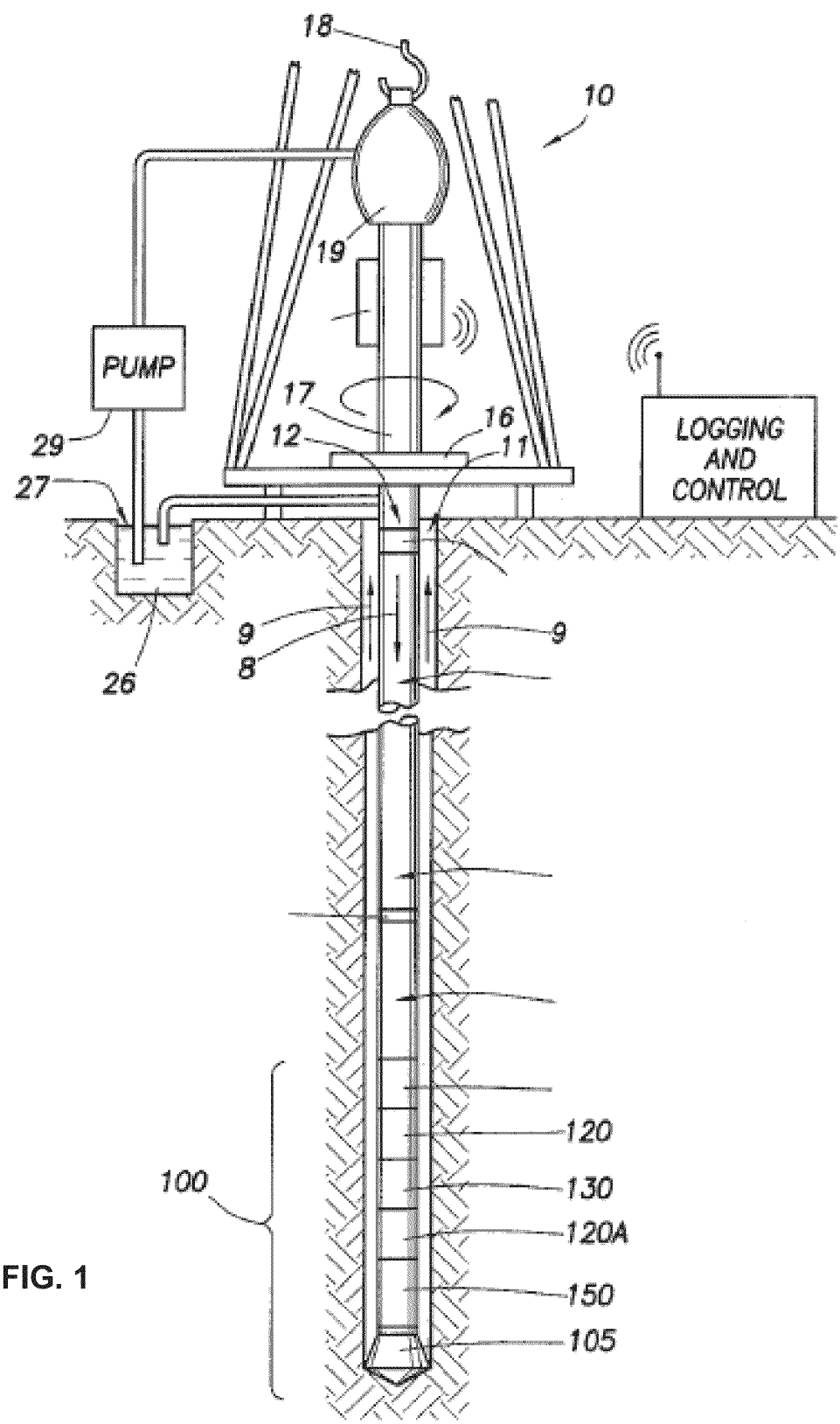
FIG. 1 illustrates an example system in which embodiments of methods and apparatus to multiplex light signals can be implemented.

It is to be understood that the following disclosure provides many different embodiments or examples for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features such that the first and second features may not be in direct contact.

One or more aspects of the present disclosure relate to methods and apparatus to multiplex light signals. One technique which may be used to determine one or more characteristics of a formation fluid in-situ is spectroscopy. In some applications of spectroscopy, light is shone onto and/or through a fluid sample, and an interaction between the light and the fluid sample is detected by an optical detector such as, for example, a spectrometer. Based on the interaction, one or more characteristics of the fluid sample may be determined.

Example fluid analysis systems disclosed herein may be used to determine characteristics and/or properties of multiple fluid samples while employing a single light source and a single optical detector. During operation of a downhole tool, formation fluids from different areas and/or zones of a subterranean formation may be drawn into the downhole tool to be analyzed in-situ. In some examples disclosed herein, a light flux may be directed into a plurality of optical paths to convey a plurality of light signals. As the light signals are propagating along the optical paths, an intensity of each of the light signals is modulated at a respective frequency by an optical chopper to enable the light signals to be frequency-division multiplexed. In some examples, each of the light signals is also shuttered during different time slots to enable time-division multiplexing of the light signals.

One of the light signals may be a reference signal, which bypasses the fluid samples. The other light signals may be fluid measurement signals, each of which interacts with one of the fluid samples (e.g., the fluid measurement signals are partially absorbed, reflected, etc. by the fluid samples). Downstream of the fluid samples along the optical paths, the light signals are combined to generate a multiplexed signal. The optical detector may receive the multiplexed signal, and the light signals are separated or demultiplexed from the multiplexed signal based on the frequencies of the intensity modulations of the light signals and/or the time slots in which the light signals are detected.

FIG. 1 illustrates a wellsite system in which examples disclosed herein can be employed. The wellsite can be onshore or offshore. In this example system, a borehole 11 is formed in subsurface formations by rotary drilling in a manner that is well known. Other examples can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the derrick assembly 10 including a rotary table 16, a kelly 17, a hook 18 and a rotary swivel 19. The drill string 12 is rotated by the rotary table 16, energized by means not shown, which engages the kelly 17 at an upper end of the drill string 12. The drill string 12 is suspended from the hook 18, attached to a traveling block (also not shown), through the kelly 17 and the rotary swivel 19, which permits rotation of the drill string 12 relative to the hook 18. In some examples, a top drive system could be used.

In the illustrated example, the surface system further includes drilling fluid or mud 26 stored in a pit 27 formed at the well site. A pump 29 delivers the drilling fluid 26 to the interior of the drill string 12 via a port in the swivel 19, causing the drilling fluid 26 to flow downwardly through the drill string 12 as indicated by the directional arrow 8. The drilling fluid exits the drill string 12 via ports in the drill bit 105, and then circulates upwardly through the annulus region between the outside of the drill string 12 and the wall of the borehole 11, as indicated by the directional arrows 9. In this well known manner, the drilling fluid 26 lubricates the drill bit 105 and carries formation cuttings up to the surface as it is returned to the pit 27 for recirculation.

The bottom hole assembly 100 of the illustrated example includes a logging-while-drilling (LWD) module 120, a measuring-while-drilling (MWD) module 130, a roto-steerable system and motor, and the drill bit 105.

The LWD module 120 is housed in a special type of drill collar, as is known in the art, and can contain one or more logging tools. It will also be understood that more than one LWD and/or MWD module can be employed, for example, as represented at 120A. References throughout to a module at the position of module 120 can mean a module at the position of module 120A. The LWD module 120 includes capabilities for measuring, processing, and storing information, as well as for communicating with the surface equipment. In the illustrated example, the LWD module 120 includes a fluid sampling device.

The MWD module 130 is also housed in a special type of drill collar, as is known in the art, and can contain one or more devices for measuring characteristics of the drill string 12 and the drill bit 105. The MWD tool further includes an apparatus (not shown) for generating electrical power to the downhole system. This may include a mud turbine generator powered by the flow of the drilling fluid 26, and/or other power and/or battery systems. In the illustrated example, the MWD module 130 includes one or more of the following types of measuring devices: a weight-on-bit measuring device, a torque measuring device, a vibration measuring device, a shock measuring device, a stick slip measuring device, a direction measuring device, and an inclination measuring device.

Figure 2:
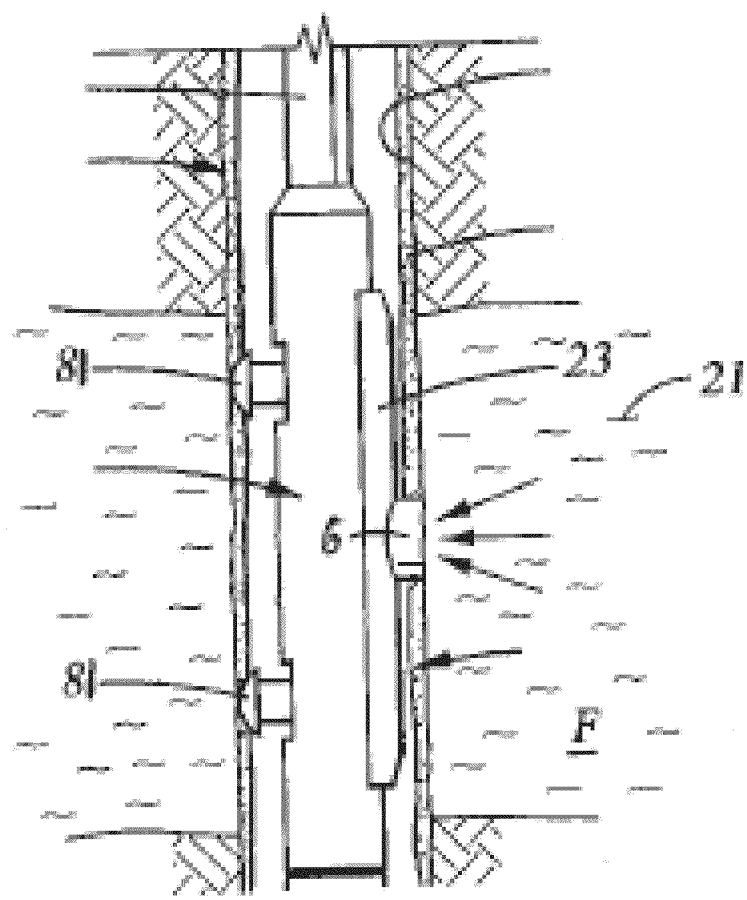
FIG. 2 illustrates another example system in which embodiments of methods and apparatus to multiplex light signals can be implemented.

FIG. 2 is a simplified diagram of a sampling-while-drilling logging device of a type described in U.S. Pat. No. 7,114,562, incorporated herein by reference, utilized as the LWD tool 120 or part of the LWD tool suite 120A. The LWD tool 120 is provided with a probe 6 for establishing fluid communication with the formation and drawing fluid 21 into the tool, as indicated by the arrows. The probe 6 may be positioned in a stabilizer blade 23 of the LWD tool 120 and extended therefrom to engage a borehole wall. The stabilizer blade 23 comprises one or more blades that are in contact with the borehole wall. The fluid 21 drawn into the tool using the probe 6 may be measured to determine, for example, pretest and/or pressure parameters. The LWD tool 120 may be provided with devices, such as sample chambers, for collecting fluid samples for retrieval at the surface. Backup pistons 81 may also be provided to assist in applying force to push the drilling tool and/or probe 6 against the borehole wall.

Figure 3:
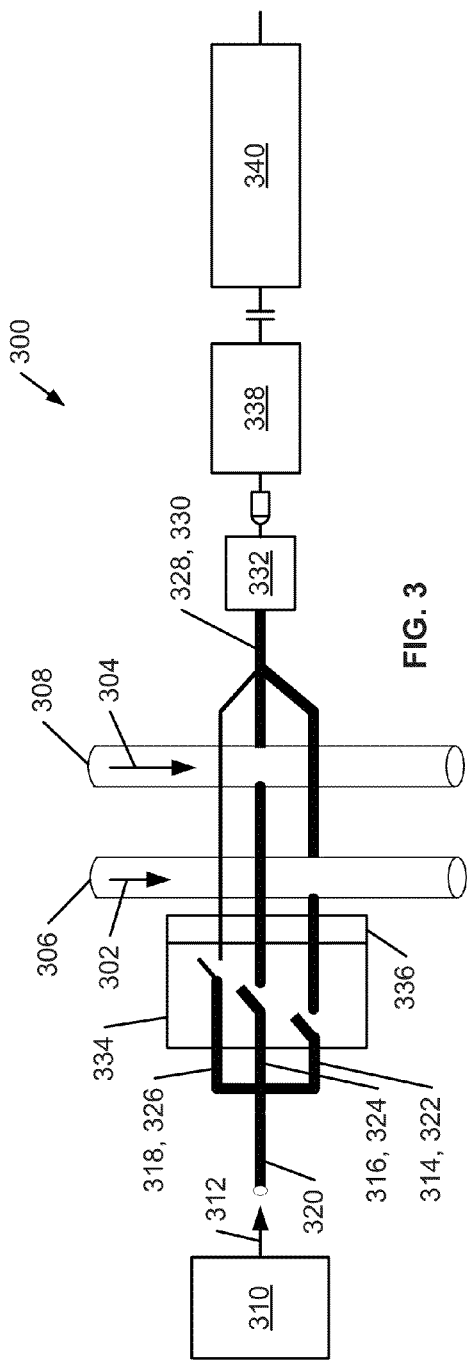
FIG. 3 illustrates yet another example system in which embodiments of methods and apparatus to multiplex light signals can be implemented.

FIG. 3 illustrates an example fluid analysis system 300 disclosed herein, which may be used to determine properties and/or characteristics of a first fluid sample 302 and a second fluid sample 304. The example fluid analysis system 300 may be employed via a downhole tool such as, for example, the LWD tool 120 of FIGS. 1 and 2, and/or any other suitable type of downhole tool disposed downhole via any suitable conveyance type (e.g., wireline, coiled tubing, etc.). In the illustrated example, the first fluid sample 302 is flowing through a first flowline 306, and the second fluid sample 304 is flowing through a second flowline 308. Other examples include other numbers (e.g., 1, 3, 4, 5, etc.) of flowlines and/or fluid samples. The first fluid sample 302 may be extracted from a first area of a subterranean formation into the first flowline 306, and the second fluid sample 304 may be extracted from a second area of the subterranean formation into the second flowline 308.

In the illustrated example, a light source 310 (e.g., a lamp, a diode laser, a solid state laser, a light emitting diode (LEDs), and/or any other light source) generates a light flux 312. The example light flux 312 is divided into a first measurement signal, a second measurement signal and a reference signal ("the light signals"). The first measurement signal is directed along a first optical path 314; the second measurement signal is directed along a second optical path 316; and the reference signal is directed along a third optical path 318. In the illustrated example, the light flux 312 is directed into a first fiber bundle 320 (e.g., a plurality of optical fibers), which is divided or split into three fiber sub-bundles 322, 324, 326 (e.g., each including one or more optical fibers), which define the first optical path 314, the second optical path 316 and the third optical path 318, respectively. In some examples, the light flux 312 is divided and/or the light signals are directed along the first optical path 314, the second optical path 316 and/or the third optical path 318 via optics such as, for example, a mirror, a prism, a lens, etc.

The first optical path 314 is in optical communication with the first fluid sample 302 (e.g., via one or more windows of the first flowline 306) to direct the first measurement signal to interact with the first fluid sample 302. The second optical path 316 is in fluid communication with the second fluid sample 304 (e.g., via one or more windows of the second flowline 308) to direct the second measurement signal to interact with the second fluid sample 304. The third optical path 318 bypasses the first flowline 306 and the second flowline 308 and, thus, the reference signal does not interact with any fluid samples. Downstream of the first flowline 306 and the second flowline 308 along the optical paths 314, 316 and 318, the first optical path 314, the second optical path 316 and the third optical math merge into an optical detection path 328. In the illustrated example, the first optical path 314, the second optical path 316 and the third optical path 318 are merged by gathering and/or combining the sub-fiber optic bundles 322, 324 and 326 to form a second fiber bundle 330, which defines the optical detection path 328.

A plurality of light signals that are combined within one optical path are multiplexed. A multiplexed light signal is a light signal generated by combining a plurality of light signals. In the illustrated example, the first optical path 314, the second optical path 316 and the third optical path 318 merge into the optical detection path 328 to combine the light signals to form a multiplexed light signal. As described in greater detail below, the light signals are frequency-division multiplexed and time-division multiplexed. In the illustrated example, the multiplexed light signal is directed into an optical detector 332 via the optical detection path 328. As described in greater detail below, the multiplexed light signal may be demultiplexed to obtain and/or determine information related to the first fluid sample 302 and/or the second fluid sample 304.

Frequency-division multiplexing involves multiplexing a plurality of light signals by modulating a characteristic (e.g., the intensities) of the light signals at different frequencies. To enable the light signals to be frequency-division multiplexed, the example fluid analysis system 300 of FIG. 3 includes an optical chopper 334. In the illustrated example, the optical chopper 334 is interposed along the first optical path 314, the second optical path 316 and the third optical path 318. In the illustrated example, the optical chopper 334 is disposed upstream of the fluid samples 302 and 304 along the first optical path 314, the second optical path 316 and the third optical path 318. However, in other examples, the optical chopper 334 is interposed downstream of the fluid samples 302 and 304, between the fluid samples 302 and 304, or in any other suitable position. The optical chopper 334 may be a rotatable wheel or disk, a digital light processing (DLP) device, a micro-electro-mechanical (MEMS) device, an optical router switch employing an air bubble, a rotating polygon mirror, a cascaded tunable optical filter or modulator, a liquid crystal diode shutter, and/or any other suitable optical chopper. In some examples, more than one optical chopper is employed.

In the illustrated example, the optical chopper 334 modulates an intensity of each of the light signals by periodically interrupting the light signals by, for example, chopping the light signals. When a light signal is periodically obstructed, the light signal is chopped. For example, the optical chopper 334 may chop the first measurement signal at a first frequency, the second measurement signal at a second frequency different than the first frequency, and the reference signal at a third frequency different than the first frequency and the second frequency. As a result, the light signals may be frequency-division multiplexed.

Time division multiplexing involves multiplexing a plurality of light signals by conveying the light signals in different time slots. The example fluid analysis system 300 of FIG. 3 includes an optical shutter 336 to enable the light signals to be time-division multiplexed. In the illustrated example, the optical shutter 336 is interposed downstream of the first fluid sample 302 and the second fluid sample 304. In other examples, the optical shutter 336 is disposed between the first fluid sample 302 and the second fluid sample 304, downstream of the first fluid sample 302 and the second fluid sample 304, or in any other suitable position in the fluid analysis system 300. The optical shutter 336 may be a rotatable wheel or disk, a digital light processing (DLP) device, a micro-electro-mechanical (MEMS) device, an optical router switch employing an air bubble, a rotating polygon mirror, a cascaded tunable optical filter or modulator, a liquid crystal diode shutter, and/or any other suitable optical shutter. In some examples, the light source 310 may be controlled (e.g., switched periodically on and off) to convey the light signals in different time slots and/or at different frequencies. As described in greater detail below in conjunction with FIG. 11, the optical chopper 334 and the optical shutter 336 may implemented by one optical chopper.

The example optical shutter 336 shutters each of the light signals during two of three sequential time slots in each of a plurality of recurrent time periods. In the illustrated example, the optical shutter 336 periodically shutters the first measurement signal during a second time slot and a third time slot of each time period; the second measurement signal during a first time slot and the third time slot during each time period; and the third measurement signal during the first time slot and the second time slot during each time period. As a result, the first measurement signal is periodically communicated during the first time slot; the second measurement signal is periodically communicated during the second time slot; and the third measurement signal is periodically communicated during the third time slot.

Downstream of the optical chopper 334, the optical shutter 336, the first fluid sample 302 and the second fluid sample 304, the light signals are directed into the optical detection path 328 and combined to form a multiplexed light signal. As a result, the light signals are frequency-division multiplexed and time-division multiplexed. In the illustrated example, to direct the light signals into the optical detection path 328, the fiber sub-bundles 322, 324 and 326 are combined and/or gathered to form the second fiber bundle 330. The optical detector 332 (e.g., a spectrometer) receives the multiplexed light signal via the second fiber bundle 330. In the illustrated example, the optical detector 332 is in communication with a signal conditioner 338 (e.g., a current-to-voltage (I-V) converter, an amplifier, and/or any other signal conditioner) and a signal processor 340 to demultiplex the multiplexed light signal. In some examples, the optical detector 332 may be in communication with one or more other electronic devices. In some examples, the optical detector 332 includes a light sensor employing a photo diode and/or any other suitable optical detector. In the illustrated example, the optical detector 332 detects intensities of the multiplexed light signal and converts the multiplexed light signal to a multiplexed electrical signal (e.g., an electrical signal composed of a plurality of electrical signals) such as, for example, an alternating current (AC) signal. In some examples, the optical detector 332 resolves a broadband spectrum of light into one or more spectrums of interest. To facilitate signal processing, the signal conditioner 338 converts the multiplexed electrical signal from a current signal to a voltage signal. The example signal processor 340 processes the voltage signal by, for example, filtering the voltage signal to separate information corresponding to each of the light signals from each other and/or noise. Thus, information related to the first fluid sample 302 and/or the second fluid sample 304 (e.g., characteristics, properties, etc.) may be obtained and/or determined via the example fluid analysis system 300 of FIG. 3.

Figure 4:
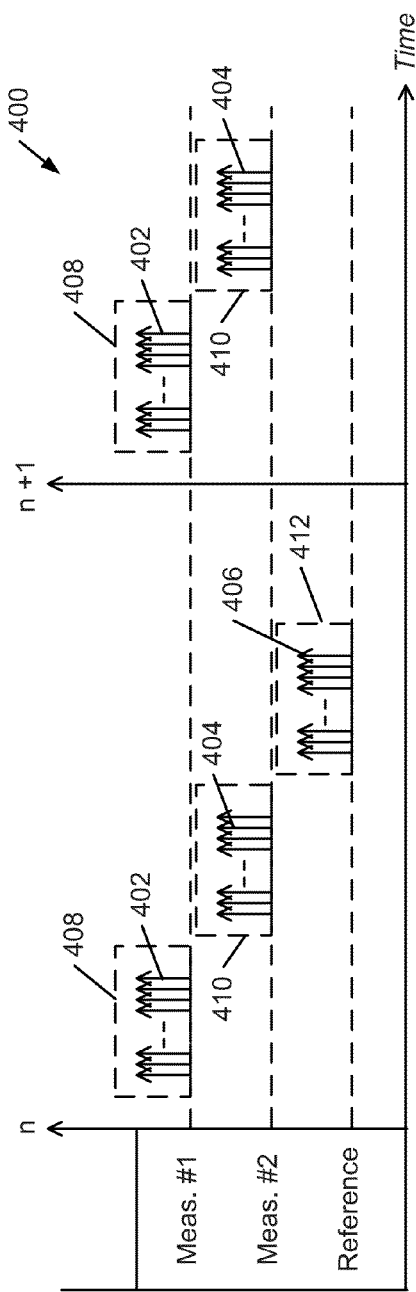
FIG. 4 illustrates an example multiplexed light signal disclosed herein.

FIG. 4 is a graphical representation of a multiplexed light signal 400 received by the optical detector 332 of FIG. 3. In the illustrated example, the multiplexed light signal 400 includes a first measurement signal 402 having an intensity modulated at the first frequency; a second measurement signal 404 having an intensity modulated at the second frequency different than the first frequency; and a reference signal 406 having an intensity modulated at the third frequency different than the first frequency and the second frequency. Thus, by processing the multiplexed signal 400 based on the frequencies, information corresponding to each of the light signals 402, 404 and 406 may be distinguished, isolated, extracted, etc. from the multiplexed light signal 400.

The light signals 402, 404 and 406 are also transmitted sequentially within the example multiplexed light signal 400 during recurrent time periods (n, n+1, etc.). In the illustrated example, the first measurement signal 402 is transmitted during a first time slot 408 in each time period, the second measurement signal 404 is transmitted in a second time slot 410 in each time period, and the reference signal 406 is transmitted during a third time slot 412 in each time period. Thus, by processing the example multiplexed light signal 400 based on the time slots 408, 410 and 412, information corresponding to each of the light signals 402, 404 and 406 may be distinguished, isolated, extracted, etc. from the multiplexed light signal 400.

FIG. 5 illustrates the example fluid analysis system 300 of FIG. 3 without the optical shutter 336. Thus, in the illustrated example, a first measurement signal, a second measurement signal and the reference signal are frequency-division multiplexed and not time-division multiplexed. Thus, a multiplexed signal generated via the example fluid analysis system 300 of FIG. 5 includes the first measurement signal, the second measurement signal and/or the reference signal in overlapping time slots. In the illustrated example, the optical shutter 336 is disposed downstream of the first fluid sample 302 and the second fluid sample 304.

FIG. 6 is a graphical representation of a first measurement signal 600, a second measurement signal 602 and a third measurement signal 604 downstream of the optical chopper 334 of FIG. 5. In the illustrated example, the first measurement signal 600, the second measurement signal 602 and the third measurement signal 604 are represented as square waves having frequencies corresponding to the respective frequencies at which the first measurement signal 600, the second measurement signal 602 and the third measurement signal 604 are chopped.

FIG. 7 is a graphical representation of an example multiplexed signal 700 generated by frequency-division multiplexing the first measurement signal 600, the second measurement signal 602 and the reference signal 604 of FIG. 6 via the example fluid analysis system 300 of FIG. 5. The signal processor 340 may demultiplex the multiplexed signal 700 to obtain and/or determine information corresponding to the first fluid sample 302 and the second fluid sample 304.

FIG. 8 is a graphical representation of the multiplexed signal 700 demultiplexed into three component voltage signals 800, 802 and 804 (represented in the frequency domain) corresponding to the first measurement signal 600, the second measurement signal 602 and the reference signal 604, respectively. In the example fluid analysis system 300 of FIG. 5, the signal processor 340 demultiplexes the voltage signals 800, 802 and 804 from the multiplexed signal 700. In the illustrated example, the voltage signals 800, 802 and 804 are frequency components of the multiplexed signal 700 of FIG. 7 corresponding to the first measurement signal 600, the second measurement signal 602 and the reference signal 604 of FIG. 6. Based on the frequency components, one or more properties and/or characteristics of the first fluid sample 302 and/or the second fluid sample 304 may be determined.

Figure 9:
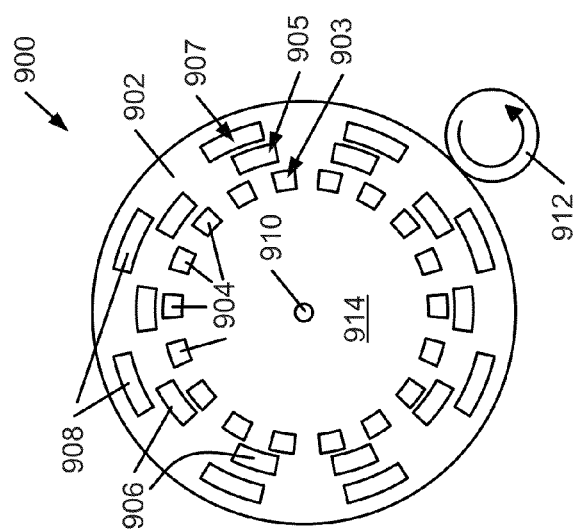
FIG. 9 illustrates various components of an example device that can implement embodiments of methods and apparatus to multiplex light signals.

FIG. 9 illustrates an example optical chopper 900 disclosed herein, which may be used to implement the optical chopper 334 of FIGS. 3 and 5. In the illustrated example, the optical chopper 900 includes a disk 902 defining a first set 903 of first openings 904, a second set 905 of second openings 906 and a third set 907 of third openings 908. The example first openings 904 of the first set 903 are defined by the disk 902 in a first circular pattern, and each of the first openings 904 is disposed a first distance from a center 910 of the disk 902. The example second openings 906 of the second set 905 are defined by the disk 902 in a second circular pattern, and each of the second openings 906 is at a second distance farther than the first distance from the center 910 of the disk 902. The example third openings 908 of the third set 907 are defined by the disk 902 in a third circular pattern, and each of the third openings 908 is at a third distance from the center 910 of the disk 902 farther than the second distance. Thus, in the illustrated example, the openings 904, 906 and 908 are defined within three concentric annuli, respectively, of the disk 902 of the optical chopper 900.

During operation of the example optical chopper 900, the first, second and third sets 903, 905 and 907 of openings 904, 906 and 910 are disposed along a first optical path, a second optical path and a third optical path, respectively. In some examples, the optical paths are oriented perpendicularly to the disk 902 along a radius of the disk. When the example optical chopper 900 rotates, the optical chopper 900 chops (e.g., periodically obstructs) light signals propagating along the optical paths such that each of the light signals downstream of the optical chopper 900 has an intensity modulating at a frequency corresponding to the sets 903, 905 and 907 of openings 904, 906 and 908 through which the light signal passed. In the illustrated example, the first openings 904 chop one of the light signals at a first frequency. The example second openings 906 chop one of the light signals at a second frequency less than the first frequency. The example third openings 908 chop one of the light signals at a third frequency less than the second frequency. In some examples, a motor 912 is operatively coupled to the disk 902 to rotate the disk 902.

A frequency at which the optical chopper 900 chops the light signals is a function of a speed at which the optical chopper 900 rotates (e.g., revolutions per minute), an arc length of each of the openings 904, 906, 908 through which the light signals pass, and a corresponding number of the openings 904, 906, 908 in one of the sets 903, 905 and 907. In the illustrated example, each of the example sets 903, 905 and 907 has an opening ratio of about one to one. A set of openings having an opening ratio of one to one has openings that are spaced apart along an annulus of the disk 902 of the optical chopper 900 by an arc length about equal to an arc length of one of the openings. Thus, as the optical chopper 900 rotates one rotation, about one half of the light signal is obstructed by a surface 914 of the disk 902, thereby preventing the one half of the light signal from passing downstream of the optical chopper 900, and about one half the light signal passes through the openings 902, 904 and 906 of one of the sets 903, 905 and 907.

Figure 10:
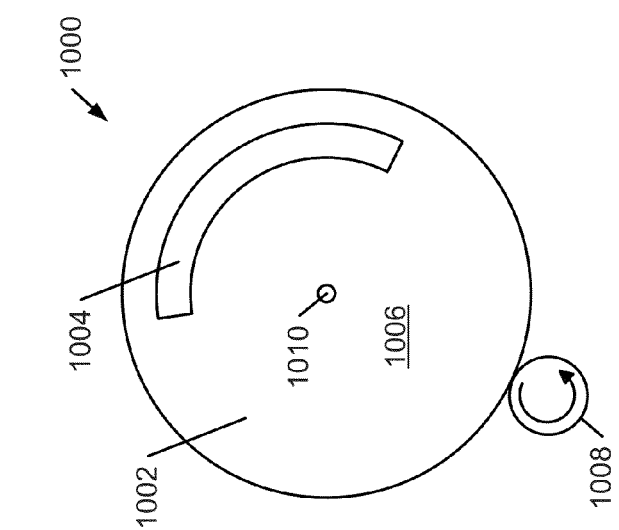
FIG. 10 illustrates various components of the example device that can implement embodiments of methods and apparatus to multiplex light signals.

FIG. 10 illustrates an example optical shutter 1000 disclosed herein, which may be used to implement the optical shutter 336 of FIG. 3. The example optical shutter 1000 interrupts a light signal during one or more time slots to enable time-division multiplexing of the light signal with other light signals. In the illustrated example, the optical shutter 1000 is a disk 1002 having one arc-shaped opening 1004 corresponding to an opening ratio of one to two. Thus, the opening 1004 of the disk 1002 has an arc length corresponding to one third of a circumference of an annulus of the disk 1002 in which the opening 1004 is defined. Thus, during one rotation of the example disk 1002, a surface 1006 the disk 1002 blocks a light signal while the disk 1002 rotates two thirds of the rotation and enables the light signal to pass through the opening 1004 while the disk 1002 rotates one third of the rotation. Some example optical shutters have other opening ratios and/or more than one opening. In the illustrated example, the disk 1002 is rotated via a motor 1008. In some example fluid analysis systems, more than one optical shutter is employed.

In some examples, the optical shutter 1000 may be used in conjunction with three optical paths. For example, the three optical paths may be in optical communication with the optical shutter 1000 at positions about 120 degrees apart from each other relative to a center 1010 of the disk 1002 along the annulus of the disk 1002 in which the opening 1004 is defined. As a result, when the optical chopper 1000 is in a given angular position, two of the optical paths are obstructed by the disk while one of the optical paths passes through the opening 1004. Other examples may be used in conjunction with other numbers (e.g., 2, 4, 5, etc.) of optical paths and/or light signals.

Figure 11:
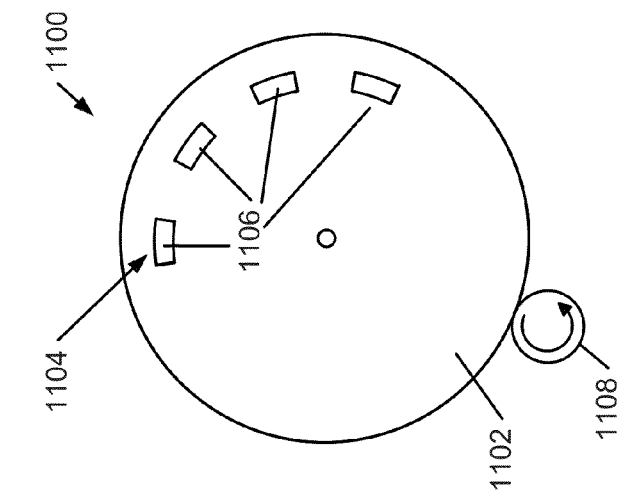
FIG. 11 illustrates various components of the example device that can implement embodiments of methods and apparatus to multiplex light signals.

FIG. 11 illustrates an example optical chopper 1100, which may be used in implement the optical chopper 334 and the optical shutter 336 of FIG. 3. The example optical chopper 1100 of FIG. 11 modulates an intensity of a light signal during one time slot and blocks or obstructs the light signal during other time slots. Thus, the example optical chopper 1100 enables frequency-division multiplexing and time-division multiplexing of the light signal.

In the illustrated example, the optical chopper 1100 is a disk 1102 having a set 1104 of openings 1106. In the illustrated example, the set 1104 includes four openings 1106 substantially equally spaced apart. The example openings 1106 are defined by the disk 1102 in an arc-shaped pattern that extends along about one third of a circumference of an annulus of the disk 1102 in which the openings 1106 are defined. During operation of the example optical chopper 1100, the disk 1102 rotates. In some examples, a motor 1108 is operatively coupled to the disk 1102 to rotate the disk 1102. During each rotation, the optical chopper 1100 obstructs a light signal conveyed via an optical path during time slots corresponding to an amount of time to rotate the disk 1102 two thirds of the rotation and chops the light signal during one time slot corresponding an amount of time to rotate the disk 1102 one third of the rotation. In some examples, the optical chopper 1100 may have other sets of openings to chop light signals conveyed via other optical paths.

Figure 12:
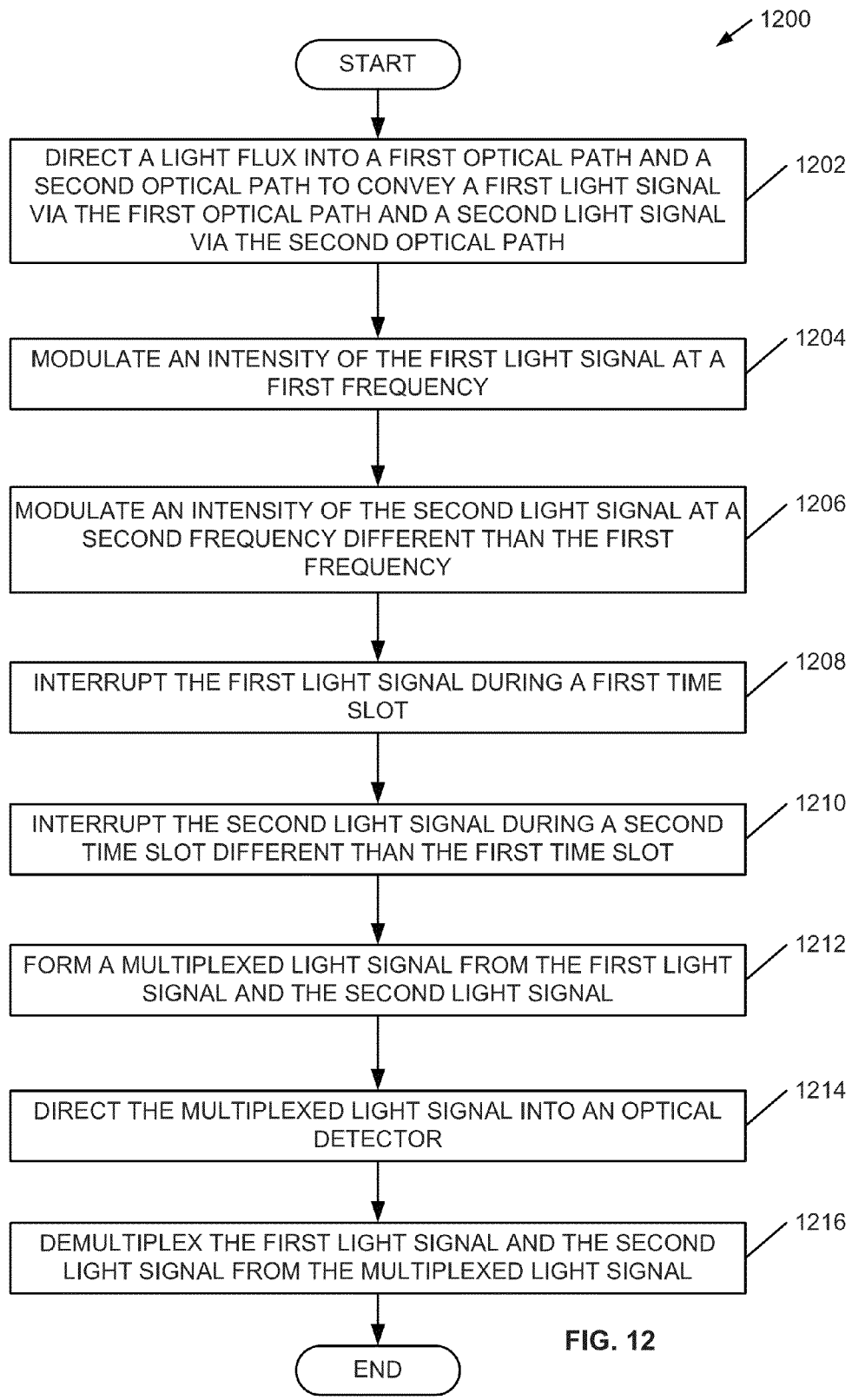
FIG. 12 illustrates example method(s) for multiplexing light signals in accordance with one or more embodiments.

FIG. 12 depicts an example flow diagram representative of an example method 1200 that may be implemented using, for example, computer readable instructions. The example method 1200 of FIG. 12 may be performed using a processor, a controller and/or any other suitable processing device. For example, the example method 1200 of FIG. 12 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. The example method 1200 of FIG. 12 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

The example method 1200 of FIG. 12 may be implemented using any combination(s) of application specific integrated circuit(s) (ASIC(s)), programmable logic device(s) (PLD(s)), field programmable logic device(s) (FPLD(s)), field programmable gate array(s) (FPGA(s)), discrete logic, hardware, firmware, etc. Also, one or more operations depicted in FIG. 12 may be implemented manually or as any combination(s) of any of the foregoing techniques, for example, any combination of firmware, software, discrete logic and/or hardware. In some examples, the example method 1200 of FIG. 12 may be implemented using the light source 310 of FIG. 3, the optical chopper 334 of FIG. 3, the optical shutter 336 of FIG. 3, the optical chopper 900 of FIG. 9, the optical shutter 1000 of FIG. 10, the optical chopper 1100 of FIG. 11, the optical detector 332 of FIG. 3, the signal conditioner 338 of FIG. 3, the signal processor 340 of FIG. 3, etc. Further, one or more operations depicted in FIG. 12 may be implemented at the surface and/or downhole. In some examples, analog processing and/or digital processing devices may be used to implement one or more operations of the example method 1200 of FIG. 12.

Further, although the example method 1200 of FIG. 12 is described with reference to the flow diagram of FIG. 12, other methods of implementing the method 1200 of FIG. 12 may be employed. For example, the order of execution of the blocks may be changed, and/or some of the blocks described may be changed, omitted, sub-divided, or combined. Additionally, one or more of the operations depicted in FIG. 12 may be performed sequentially and/or in parallel by, for example, separate processing threads, processors, devices, discrete logic, circuits, etc.

The example method 1200 begins by directing a light flux (e.g., the light flux 312 generated by the example light source 310 of FIG. 3) into a first optical path (e.g., the first fiber sub-bundle 322 of FIG. 3.) and a second optical path (e.g., the second fiber sub-bundle 324 of FIG. 3) to convey a first light signal via the first optical path and a second light signal via the second optical path (block 1202). For example, the light flux may be directed into a fiber bundle (e.g., the first fiber bundle 320 of FIG. 3), which is split into a plurality of fiber sub-bundles (e.g., the fiber sub-bundles 322, 324, and 326 of FIG. 3) that define the first optical path and the second optical path. When the light flux is directed into the first optical path and the second optical path, the light flux propagating along the first optical path is the first light signal, and the light flux propagating along the second optical path is the second light signal.

In some examples, the first optical path is in optical communication with a first fluid sample (e.g., the first fluid sample 302 flowing through the first flowline 306 of the example fluid analysis system 300 of FIG. 3), and the second optical path is in optical communication with a second fluid sample (e.g., the example second fluid sample 304 flowing through the second flowline 308 of FIG. 3). As a result, the first light signal is directed to the first fluid sample to interact with the first fluid sample, and the second light signal is directed to the second fluid sample to interact with the second fluid sample. Some examples include a third optical path into which a third light signal is directed. In some examples, the third light signal bypasses the fluid samples.

At block 1204, an intensity of the first light signal is modulated at a first frequency. At block 1206, an intensity of the second light signal is modulated at a second frequency different than the first frequency. By modulating the intensities of the first light signal and the second light signal at different frequencies, the first and second light signal may be frequency-division multiplexed. In some examples, the intensities of the first light signal and/or the second light signal are modulated by chopping the light signal by, for example, operating an optical chopper (e.g., the optical chopper 334 of FIG. 3, the optical chopper 900 of FIG. 9, the optical chopper 1100 of FIG. 11, and/or any other suitable optical chopper). At block 1208, the first light signal is interrupted during a first time slot. The second light signal is interrupted during a second time slot different than the first time slot (block 1210). In some examples, the first and second light signals are interrupted by shuttering or obstructing the first light signal and the second light signal via an optical shutter (e.g., the optical shutter 336 of FIG. 3, the optical shutter 1000 of FIG. 10, the optical chopper 1100 of FIG. 11, and/or any other suitable optical shutter). By interrupting the first light signal during the first time slot and the second light signal during the second time slot, the first and second light signals may be time-division multiplexed.

At block 1212, a multiplexed light signal is formed from the first light signal and second light signal. In the illustrated example, the first light signal and the second light signal are frequency-division multiplexed and time-division multiplexed to enable generation of the multiplexed light signal. In some examples, the first and second optical paths are merged (e.g., two or more fiber sub-bundles are combined) to combine the first light signal and the second light signal to form the multiplexed light signal from the first light signal and the second light signal. The multiplexed light signal is directed into an optical detector (e.g., the example optical detector 332 of FIG. 3) (block 1214). At block 1216, the first light signal and the second light signal are demultiplexed from the multiplexed signal. In some examples, the optical detector and/or other electronics (e.g., the signal conditioner 338 of FIG. 3) convert the multiplexed light signal into a multiplexed electrical signal. A signal processor (e.g., the example signal processor 340 of FIG. 3) may process the multiplexed electrical signal by, for example, isolating frequency components of the electrical signal corresponding to the first light signal and/or the second light signal. Based on the frequency components, information related to the first fluid sample and the second fluid sample may be obtained.

Although only a few example embodiments have been described in detail above, those skilled in the art will readily appreciate that many modifications are possible in the example embodiments without materially departing from fluid filters. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. A method for fluid analysis, comprising:
    conveying a first light signal via a first optical path;
    conveying a second light signal via a second optical path;
    frequency-division multiplexing and time-division multiplexing the first light signal and the second light signal to enable generation of a multiplexed light signal;
    directing the multiplexed light signal into an optical detector;
    directing the first light signal to a first fluid sample to interact with the first fluid sample; and
    directing the second light signal to a second fluid sample to interact with the second fluid sample,
    processing the multiplexed light signal to determine first information corresponding to the first fluid sample and second information corresponding to the second fluid sample.

2. The method of claim 1 wherein frequency-division multiplexing comprises modulating an intensity of the first light signal at a first frequency and modulating an intensity of the second light signal at a second frequency, wherein the second frequency is different than the first frequency.

3. The method of claim 1 further wherein time-division multiplexing the first light signal and the second light signal comprises interrupting the first light signal during a first time slot and interrupting the second light signal during a second time slot.

4. The method of claim 3 wherein interrupting the first light signal comprises operating an optical shutter.

5. The method of claim 1 wherein frequency-division multiplexing and timedivision multiplexing comprises combining the first light signal and the second light signal in a third optical path.

6. The method of claim 2 wherein modulating the intensity of the first light signal comprises operating an optical chopper.

7. A method for fluid analysis, comprising:
    directing a light flux into a first fiber bundle, the first fiber bundle to split into a first fiber sub-bundle and a second fiber sub-bundle;
    chopping a first light signal communicated via the first fiber sub-bundle at a first frequency;
    shuttering the first light signal during a first time slot;
    chopping a second light signal communicated via the second fiber sub-bundle at a second frequency different than the first frequency;
    shuttering the second light signal during a second time slot different than the first time slot;
    combining the first light signal and the second light signal to form a multiplexed light signal;
    converting the multiplexed light signal to a multiplexed electrical signal; and
    processing the multiplexed electrical signal to separate information corresponding to each of the light signals from each other and/or noise for obtaining information related to fluid sample, wherein the first fiber sub-bundle is in optical communication with a first fluid sample and further comprising interacting the first light signal with the fluid sample.

8. The method of claim 7 wherein chopping the first light signal comprises rotating an optical chopper disk.

9. The method of claim 7 wherein shuttering the first light signal comprises rotating an optical shutter disk.

10. The method of claim 7 further comprising:
directing the multiplexed signal to an optical detector; and
demultiplexing the multiplexed signal.

11. An apparatus, comprising:
a downhole tool;
a first flowline and a second flowline disposed in the downhole tool;
a first optical path to be in optical communication with a first fluid sample flowing through the first flowline;
a second optical path to be in optical communication with a second fluid sample flowing through the second flowline, the first optical path and the second optical path to merge into a third optical path;
an optical chopper disposed along at least one of the first optical path or the second optical path;
an optical shutter disposed along at least one of the first optical path or the second optical path; and
an optical detector in optical communication with the third optical path to receive a multiplexed light signal via the third optical path.

12. The apparatus of claim 11 further comprising a signal processor in communication with the optical detector to demultiplex the multiplexed light signal.

13. The apparatus of claim 11 wherein the optical shutter comprises a rotatable disk.

14. The apparatus of claim 11 wherein the optical chopper comprises a rotatable disk.

15. The apparatus of claim 14 wherein an opening ratio of the optical chopper is about one to one.

16. The apparatus of claim 11 further comprising a light source in optical communication with the first optical path and the second optical path.

17. The apparatus of claim 11 further comprising at least one optical fiber to define the first optical path.

* * * * *